US008554919B2

(12) United States Patent
Synytskyy et al.

(10) Patent No.: US 8,554,919 B2
(45) Date of Patent: Oct. 8, 2013

(54) AUTOMATIC PREEMPTION IN MULTIPLE COMPUTER SYSTEMS

(75) Inventors: Mykyta Synytskyy, Bellevue, WA (US); Amitabh Prakash Tamhane, Redmond, WA (US); Lokesh S Koppolu, Redmond, WA (US); David A. Dion, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 74 days.

(21) Appl. No.: 13/229,415

(22) Filed: Sep. 9, 2011

(65) Prior Publication Data

US 2013/0067089 A1    Mar. 14, 2013

(51) Int. Cl.
*G06F 15/16* (2006.01)

(52) U.S. Cl.
USPC .......................................... 709/226; 709/223

(58) Field of Classification Search
USPC ........................ 709/200–203, 217–227, 228
See application file for complete search history.

(56) References Cited

U.S. PATENT DOCUMENTS

| 6,904,483 | B2 | 6/2005 | Koning et al. |
| 6,986,042 | B2* | 1/2006 | Griffin .......................... 713/164 |
| 7,137,119 | B1 | 11/2006 | Sankaranarayan et al. |
| 7,210,147 | B1* | 4/2007 | Hipp et al. ..................... 719/312 |
| 7,380,247 | B2 | 5/2008 | Accapadi et al. |
| 7,478,149 | B2* | 1/2009 | Joshi et al. .................... 709/223 |
| 7,529,822 | B2* | 5/2009 | Joshi et al. .................... 709/223 |
| 7,647,379 | B2* | 1/2010 | Drouet et al. ................. 709/206 |
| 7,743,381 | B1* | 6/2010 | Tran ............................. 718/106 |
| 7,844,973 | B1 | 11/2010 | Dice |
| 7,900,206 | B1* | 3/2011 | Joshi et al. .................... 718/104 |
| 8,200,738 | B2* | 6/2012 | Roush et al. ................... 709/201 |
| 2005/0135255 | A1* | 6/2005 | Drouet et al. .................. 370/237 |
| 2007/0294578 | A1 | 12/2007 | Qiao et al. |
| 2008/0192643 | A1* | 8/2008 | Bae et al. ...................... 370/252 |
| 2009/0024868 | A1* | 1/2009 | Joshi et al. ........................ 714/4 |
| 2009/0089406 | A1* | 4/2009 | Roush et al. .................. 709/220 |
| 2009/0228892 | A1* | 9/2009 | Di Luoffo et al. ............ 718/104 |
| 2010/0125848 | A1 | 5/2010 | Dadhich et al. |
| 2011/0153824 | A1 | 6/2011 | Chikando et al. |

OTHER PUBLICATIONS

Yeo, et al., "Cluster Computing: High-Performance, High-Availability, and High-Throughput Processing on a Network of Computers", In Handbook of Nature-Inspired and Innovative Computing: Integrating Classical Models with Emerging Technologies, Chapter 16, 2006, pp. 521-551.

Foster, et al., "A Distributed Resource Management Architecture that Supports Advance Reservations and Co-Allocation", In Proceedings of Seventh International Workshop on Quality of Service, 1999, pp. 27-36.

Snell, et al., "Preemption Based Backfill", In Revised Papers from the 8th International Workshop on Job Scheduling Strategies for Parallel Processing, vol. 2537, 2002, pp. 24-37.

* cited by examiner

*Primary Examiner* — Moustafa M Meky
(74) *Attorney, Agent, or Firm* — Workman Nydegger

(57) ABSTRACT

Placing an application on a node in a cluster. A method includes determining that a first application cannot be placed on a first node in the first node's current running state. The method further includes determining that the first application may be able to be placed on the first node by shutting down or moving one or more other applications running on the first node. The method further includes attempting to shut down or move the one or more other applications on the first node to place the first application.

20 Claims, 4 Drawing Sheets

AUTOMATIC PREEMPTION IN MULTIPLE COMPUTER SYSTEMS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Computing systems could be interconnected to form a cluster with the computing systems acting as nodes in the cluster. For example, to ensure high availability of applications, it is common to host them in a distributed, multiple computer system (i.e. a cluster). However, there can be cases when one or more computing systems that are typically used as nodes in a cluster are not running or accessible due to hardware issues, network partition or other issues. A host cluster is responsible for identifying which computers are not running and then reassigning the applications hosted on those computers to other computers which are running.

Each of the applications hosted on the computers in the host cluster consume some resources like CPU and memory on the host computer, IOPS (I/O operations per second for the storage), network bandwidth, etc. The host cluster may become overloaded especially when one or more computers are not running For example, if each computer has 32 GB of memory available for the applications, and each application takes 8 GB memory, then a maximum of 12 such applications can run on a three node cluster. However, if one node is down then only eight applications can be hosted.

Often, hosters under-provision their clusters by a large safety margin so that all the applications can be hosted even when some of the computers are not running However, this results in having resources being under-utilized.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to an embodiment practiced in a distributed computing environment including a cluster. The cluster includes a plurality of nodes. An embodiment includes a method with acts for placing an application on a node in the cluster. The method includes determining that a first application cannot be placed on a first node in the first node's current running state. The method further includes determining that the first application may be able to be placed on the first node by shutting down or moving one or more other applications running on the first node. The method further includes attempting to shut down or move one or more of the one or more other applications on the first node to place the first application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein may, rather than under-provisioning their clusters, identify and shut down less important applications when computers are not available or become unavailable, so that more important applications with higher uptime guarantees are kept running This would enable hosters to make efficient use of their computing resources. As used herein, a "hoster" is an entity that deploys applications (in some examples, a large number of applications) by attempting to assign a sufficiently large amount of computing resources for the applications.

Some embodiments may (1) provide a mechanism by which they can identify how important each application is relative to others in terms of keeping it running, (2) have a mechanism to determine when any of the cluster resources required to run an application is no longer sufficient, (3) have a mechanism to identify and shutdown one or more less important applications or parts of applications to be able to run the more important applications, and/or (4) have a mechanism to restart any application that has been shutdown if enough resources become available to run it. This may enable a distributed multiple computer system hosting an application to identify real time when such resource insufficiencies arise and make decisions to ensure enough computing resources are available to more important applications by shutting down less important applications.

Embodiments may enable a distributed multiple computer system hosting applications to identify in real time when system resources required to host all the applications are insufficient, and then identify and shutdown some of the less important applications (or parts of applications) in the system in such a way that the more important applications can be hosted with least downtime.

Figure 1:
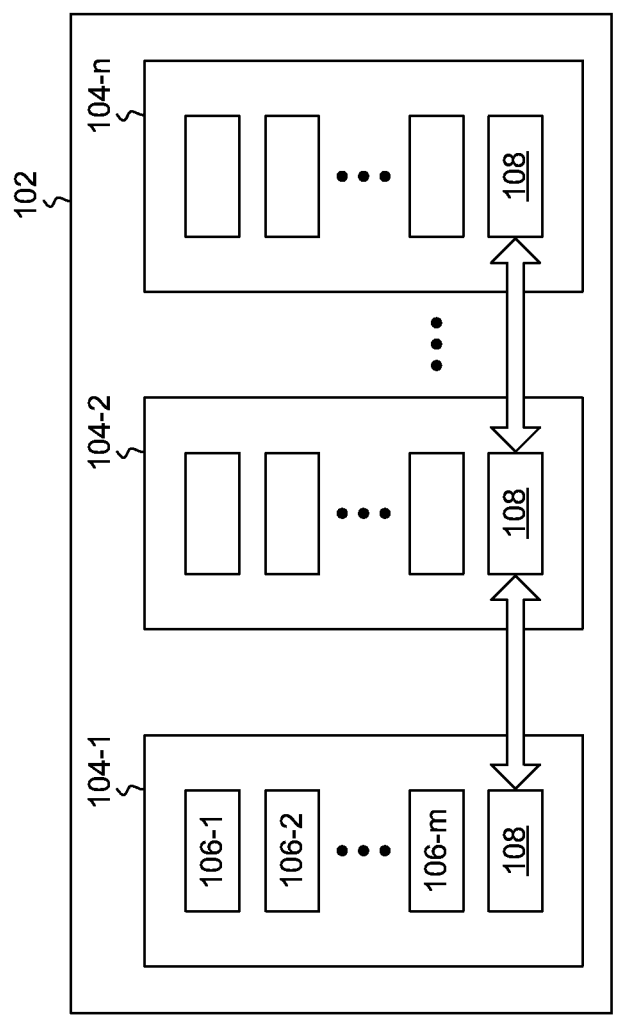
FIG. 1 illustrates a cluster and nodes in the cluster.

Referring now to FIG. 1, an example cluster 102 is illustrated. The cluster 102 includes a number of nodes referred to herein generically at 104, but illustrated specifically at 104-1, 104-2 through 104-n where the ellipses and variable "n" indicate a variable number of nodes. Each of the nodes 104 hosts one or more applications (referred to herein generically as 106). FIG. 1 illustrates specific examples of applications on node 104-1 as 106-1, 106-2 through 106-m where the ellipses and variable "m" indicate a variable number of applications. At least one or more of the nodes 104 includes an instance, or a portion of a clustering service 108. The clustering service 108 is responsible for adding new nodes 104 to the cluster 102 and for placing applications on nodes 104. While the clustering service 108 is illustrated as being distributed across nodes 104 in the example illustrated in FIG. 1, it should be appreciated that in other embodiments, the clustering service 108 may be on fewer nodes 104, such as in one embodiment on a single node implemented as a director node.

To ensure higher availability and better utilization of computing resources, hosters host a number of applications 106 in a distributed multiple computer system (a cluster 102) instead of having a dedicated computer for each application. In such a system, many applications typically run on each computer (i.e. node 104). Each of these applications needs some computing resources like CPU and memory on the host computer, IOPS (I/O operations per second for the storage), network bandwidth, etc. Usually, hosters over provision their clusters by a significant safety factor so that all the applications 106 can be hosted even when some of the nodes 104 are not running.

Figure 2:
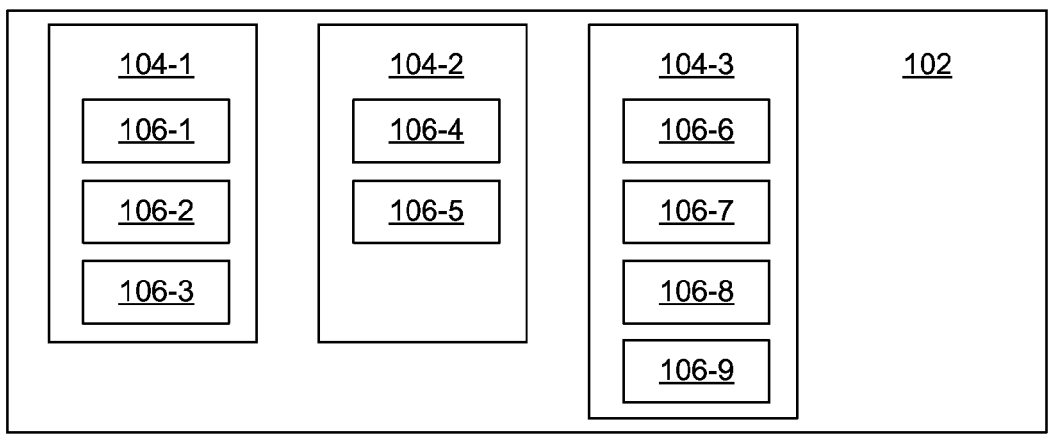
FIG. 2 illustrates another representation of the cluster and nodes in the cluster.

The cluster 102 is responsible for identifying which nodes 104 are not running and then reassigning the applications 106 hosted on those nodes 104 to other nodes 104 which are running. For example, and referring to FIG. 2 if node 104-1 were somehow shut down, one or more of the applications 106-1, 106-2 and/or 106-3 could be moved to one or more of the other nodes 104-2 and/or 104-3 on the cluster 102. However using the mechanism of preempting lower priority applications 106, hosters can provision more applications on their clusters 102. In situations when some of the nodes 104 in the cluster 102 are unavailable, it is possible that enough resources might not be present to host all the applications 106.

In such scenarios, the cluster 102 may be able to preempt lower priority applications 106 by shutting them down thereby freeing enough computing resources to be able to run the higher priority applications 106. For example, applications 106-4 and 106-5 may be lower priority applications that can be shut down to make room for applications 106-1, 106-2 and 106-3 (which may be higher priority applications) when node 104-1 fails.

As discussed herein, a cluster 102 is a distributed computing system which hosts multiple applications 106. A preemptor is a higher priority application which may not have enough resources to run and therefore causes one or more lower priority applications to be shut down. A preemptee is a lower priority application which may be shut down to free up resources for use by a higher priority application. The same application may be a preemptor or a preemptee depending on the priorities of the applications around it. For example, a medium priority application may be a preemptor when placed on a node with low priority applications, but may become a preemptee itself if a high priority application arrives on the same node.

Various different methods may be used to specify priorities and to determine if an application has sufficient priority to preempt another other application. For example, in some embodiments, applications may be given a relative rank to all other running applications in the cluster 102. Any higher priority application can preempt any application with a lower priority than itself.

Alternatively or additionally, in some embodiments, priorities may be specified by assigning an application to a priority group, where each group has a different level of priorities. For example, there could be four priorities: low, medium, high and very high. In the illustrated example, different thresholds are configured by the administrator: MinPreemptorPriority and MaxPreempteePriority. In the illustrated example, preemption can happen only if all the below conditions are met:
1. An application A1 will cause A2 to be preempted only if Priority(A1)>Priority(A2);
2. An application A1 which could not start due to insufficient resources can cause preemption of lower priority applications only if A1>=MinPreemptorPriority; and
3. An application can be preempted only if Priority(A2) <=MaxPreempteePriority These examples are merely illustrative examples and other examples may have different criteria to determine if applications can preempt or be preempted. There can be different mechanisms to define the relative priority of the applications with respect to who can be preemptors and preemptees.

Embodiments may include functionality for identifying when sufficient resources are not available to start an application. Various different mechanisms can be used to determine when a computer does not have sufficient resources to host an application. The following illustrates some examples. In one example, determining that sufficient resources are not available to start an application could be based on specific errors returned when the application cannot be started due to insufficient resources. In another example, a node 104 may track how much of each of the resources are reserved for each application currently running on it and determine when sufficient resources are not available for a new application placed on the node 104. In yet another example, a global map of reservations on each node 104 could be maintained globally across the nodes 104. This global map could be consulted to determine if sufficient resources to start an application 106 on a node 104 are available.

Similarly different mechanisms can be used to determine how much resources are required by an application. This could be used to determine what resources are required for an application to preempt another application and/or to determine what applications should be preempted based on what resources will be available once they are preempted. In some embodiments, resources required by an application (either a preemptor or a preemptee) could be determined based on a static configuration specified as part of the applications configuration. For example, a developer may specify what resources and how much of those resources an application needs to run. Alternatively, a determination of what resources are needed to run an application can be made dynamically. For example, such a determination can be made based on real time usage at that particular instance or based on averaged application usage of resources.

Preemptions may occur in a number of different scenarios. For example, in some embodiments, a node (e.g. node 104-1 in FIG. 2) may have crashed. Attempts may be made to place the applications (e.g. applications 106-1 through 106-3) running on the node (e.g. node 104-1) on other nodes (e.g. one or more of nodes 104-2 and/or 104-3). Some of those other nodes (e.g. one or more of nodes 104-2 and/or 104-3) may not have sufficient resources to run these new applications (e.g. applications 106-1 through 106-3), resulting in a need for preemption of applications (e.g. one or more of applications 106-4 through 106-9) running on the other nodes (e.g. one or more of nodes 104-2 and/or 104-3).

Figure 3:
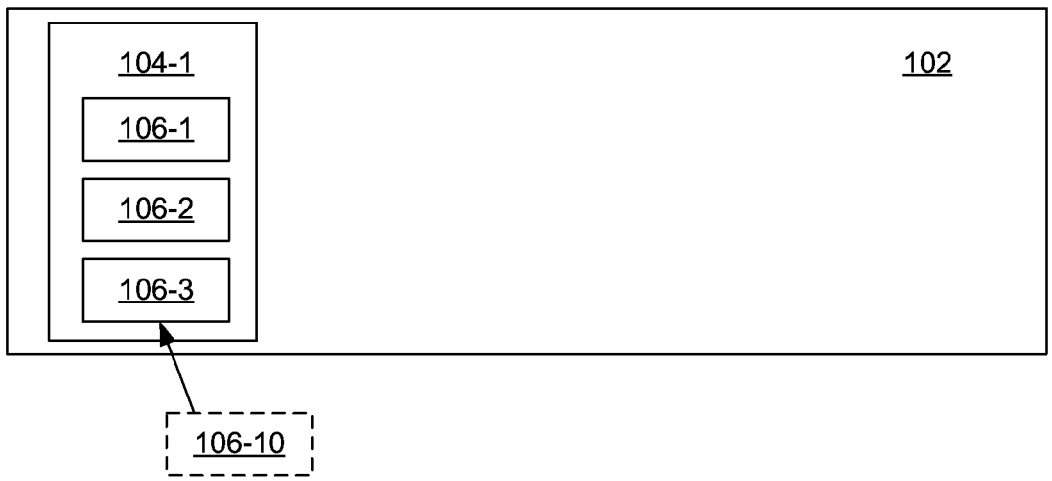
FIG. 3 illustrates adding an application to a node in the cluster.
Figure 4:
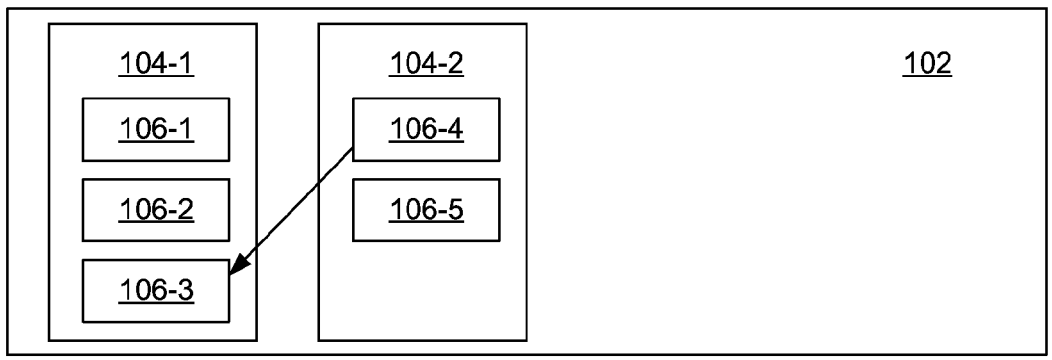
FIG. 4 illustrates moving an application from one node in the cluster to another node in the cluster.

In another example scenario illustrated in FIG. 3, an attempt is made to create or start a new application 106-10 on a node 104-1, and that node 104-1 does not have enough resources to run the new application 106-10. Thus, one or more of applications 106-1, 106-2 and/or 106-3 already running on the node 104-1 may be preempted to make room for the new application 106-10 if certain preemption conditions are met.

In another example scenario, an attempt may be made to move an application 106-4 by the administrator from one node 104-2 to another target node 104-1. The target node 104-1 may not have enough resources to run the application 106-4. Thus, one or more of applications 106-1, 106-2 and/or 106-3 already running on the node 104-1 may be preempted to make room for the new application 106-4 if certain preemption conditions are met.

Figure 5:
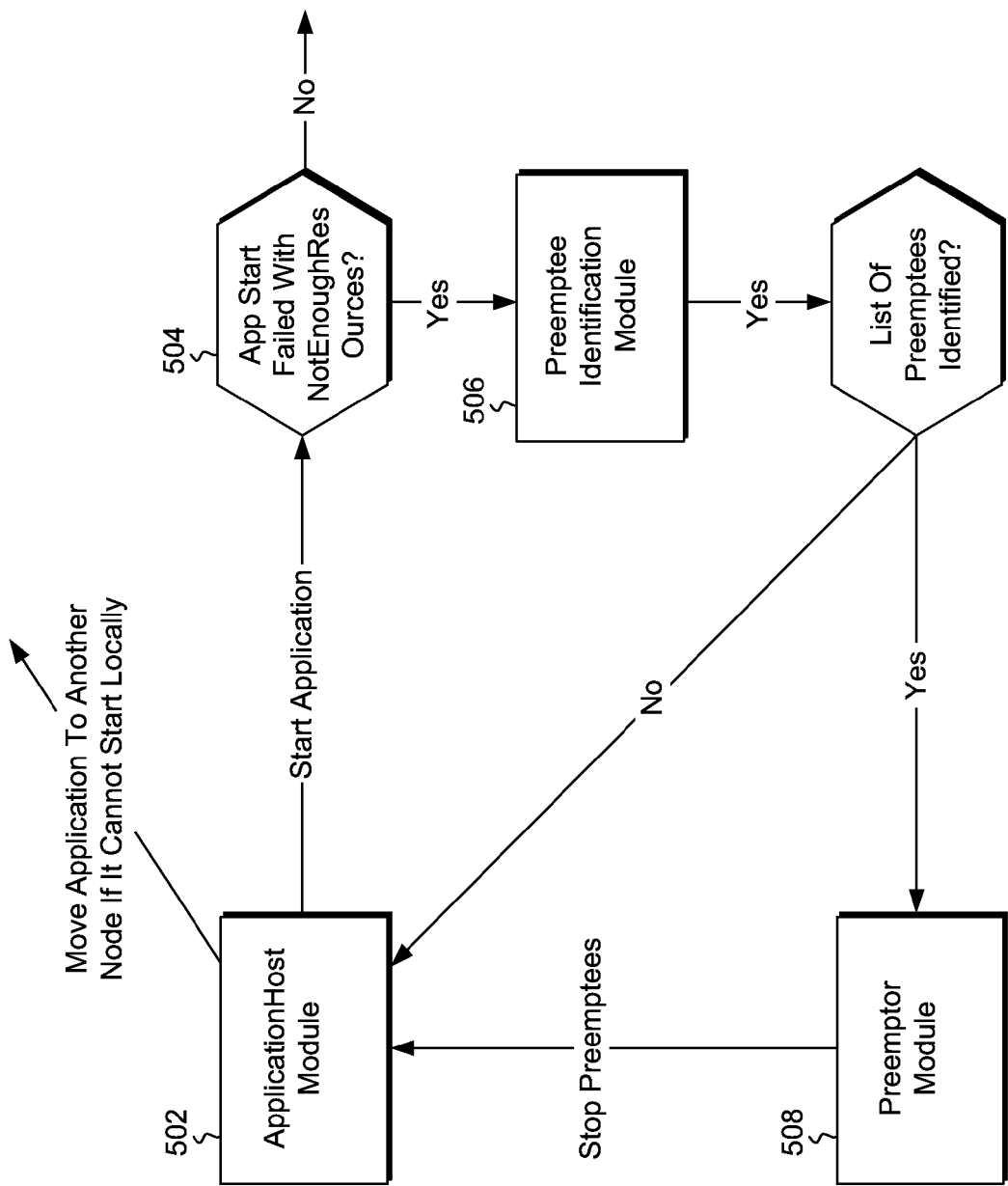
FIG. 5 illustrates actions for placing and/or pre-empting applications in a cluster.

Referring now to FIG. 5, a detailed example of preemption logic is illustrated. An ApplicationHostingModule 502 in a node determines (as illustrated at 504) that an application cannot start on a node due to insufficient resources. The ApplicationHostingModule 502 can determine if the application can be a preemptor. For example, the ApplicationHostingModule 502 may use the logic described above to determine that the application priority>MinPreemptorPriority.

The ApplicationHostingModule 502 can obtain a list of applications that can be preempted by querying the PreempteeIdentificationModule 506 which returns a minimal set of lowest priority applications to be preempted to free up enough resources to start the preemptor. Other heuristics could be used to determine this list of preemptees. For example, the PreempteeIdentificationModule 506 could pick the preemptees so that the total count is the smallest, or it could preempt all applications of a lowest priority class, or it could preempt a given fixed count of applications and keep preempting applications until it frees up sufficient resources.

The PreemptorModule 508 then stops the preemptees identified earlier and starts the preemptor after that. The PreemptorModule 508 could have different policies with respect to how aggressive it can be in stopping the preemptees. The PreemptorModule 508 could immediately terminate preemptees, or allow them sufficient time for a graceful shutdown. In some embodiments, this may be based on the importance level of either or both of the preemptor and/or preemptees. For example, a preemptor may be so important that preemptees must be immediately shut down to allow the preemptor that ability to start as quickly as possible. Alternatively, the differences in the priority levels of the preemptor and preemptees may be so great as to justify shutting down the preemptees immediately without allowing them time for a graceful shutdown. Alternatively, starting the preemptor may be less urgent such that the preemptees could be allowed to shut down gracefully.

A PreempteeRestartModule may restart the preemptees locally or move them over to other nodes to be restarted there. The PreempteeRestartModule may use different heuristics to ensure that the cluster is relatively stable. For example, the PreempteeRestartModule may wait for a period of time (e.g. 3 minutes) before it tries to restart a preemptee or place a preemptee on other nodes. Alternatively, the PreempteeRestartModule can place the preemptee on other node immediately if it sees that the preemption is due to a new application being created or started on a node, or due to application being moved by an administrator and sufficient resources are available on a different node to run the preemptees.

When an application is identified as a preemptee, either the whole application or part of it can be shut down. For example, a virtual machine application includes a virtual machine component and a virtual machine configuration component. Embodiments may only stop the Virtual Machine component while letting the virtual machine configuration component stay running as stopping it would not free any significant computing resources. The configuration of an application could specify which components need to be stopped when the application is preempted.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
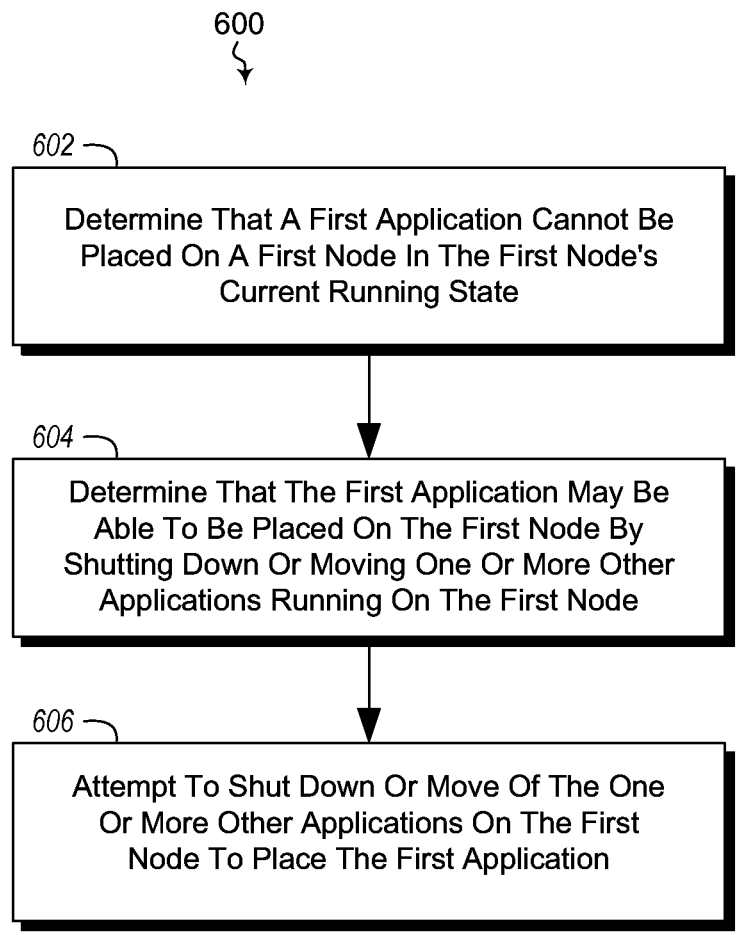
FIG. 6 illustrates a method of placing an application in a cluster.

Referring now to FIG. 6, a method 600 is illustrated. The method 600 may be practiced in a distributed computing environment including a cluster. The cluster includes a plurality of nodes. The method 600 includes acts for placing an application on a node in the cluster. The method includes determining that a first application cannot be placed on a first node in the first node's current running state (act 602). For example, the node may not have sufficient resources due to load caused by applications currently being run on the node.

The method 600 further includes determining that the first application may be able to be placed on the first node by shutting down or moving one or more other applications running on the first node (act 604). For example, a determination may be made that certain applications are using certain amounts of resources and that if those resources were freed up by stopping the certain applications, sufficient resources would be available to place the first application.

The method 600 further includes attempting to shut down or move the one or more other applications on the first node to place the first application (act 606).

The method 600 may further include determining that even after attempting to shut down or move the one or more other applications, that the first application cannot be placed on the first node. As a result, the method may further include selecting a second node on which to place the first application and thereafter repeating acts of claim 1 except that they are performed on the second node.

The method 600 may further include determining that the first application cannot run on any of the nodes in the cluster. In some such embodiments, the method 600 may include ceasing attempting to run the application on a node in the cluster. This could be done either temporally or permanently. For example, some embodiments may cease attempting placing an application on a node until new nodes are added to the cluster. Embodiments can then again begin to attempt to place an application on nodes in the cluster, possibly beginning with the newly added node. Similarly, changes in resources on existing nodes in cluster occur, such as new resources being added to a node, embodiments that had previously ceased attempting to place an application, may again attempt to place the application, possibly beginning with the node with newly added resources.

The method 600 may be practiced where the one or more other application are selected to be shut down based on having a priority that is lower than the first application. This can be based on an absolute priority rating. In an alternative embodiment, this may be based on categorizations of priority, such as in the example above with categories of low, medium, high and very high.

The method 600 may be practiced where the one or more other application are selected to be shut down based on a determination of a fewest applications affected set to minimize the number of applications that are shut down to free up resources for the first application. In particular, it may be desirable to shut down the fewest number of applications. Thus, embodiments, may try to find a single application, or a combination of applications that are currently using resources at a level near what a new application to be placed would use if started.

The method 600 may be practiced where determining that an application cannot be placed on the first node comprises receiving resource information about the node and applications running on the node. In particular, the node may include functionality for providing information about applications running on the node, resources used by the applications, available resources generally, etc. In some embodiments, this may be accomplished by using extendable plug-ins that can be used at the nodes to provide such information. The method 600 may be practiced where determining that the first application may be able to be placed on the first node by shutting down or moving one or more other applications running on the first node is based on received resource information.

As noted above, the method 600 may further include attempting to restart one or more of the one or more applications that were shut down. In some embodiments, determining which application to restart is done in fashion to prevent overloading the cluster by doing an ordered restart. In particular, attempts to restart applications may be delayed. Alternatively or additionally attempts to restart may be by priority where attempts to restart applications are done by trying to restart higher priority applications before trying to restart lower priority applications. This can be done, for example, to ensure higher availability of higher priority applications.

The method 600 may be practiced where processes used to shut down or move the one or more other applications are determined based on relative priorities of the first application and the one or more other applications. For example, if an application to be placed is of a priority that is high enough, preempted applications may be abruptly brought down without waiting for a graceful shutdown that allows for storing state information, closing connections, finalizing reads or writes, releasing locks, etc. If the priorities of the preemptor and preemptee are more closely matched, embodiments may allow for a more graceful shutdown.

The method 600 may further include, preventing the one or more other applications that were shut down from restarting to prevent a cascade of preemptions and restarts. For example, preventing may be performed to prevent any application with a priority lower than the first application from restarting while the first application is still being processed in the cluster.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment comprising a cluster, the cluster comprising a plurality of nodes, a method of placing an application on a node in the cluster, the method comprising:
   determining that a first application cannot be placed on a first node in the first node's current running state;
   determining that the first application may be able to be placed on the first node by shutting down or moving one or more other applications running on the first node; and
   attempting to shut down or move the one or more other applications on the first node to place the first application, wherein the one or more other application are selected to be shut down based on a determination of a fewest applications affected so as to minimize the number of applications that are shut down to free up resources for the first application.

2. The method of claim 1, further comprising determining that even after attempting to shut down or move the one or more other applications, that the first application cannot be placed on the first node, and as a result selecting a second node on which to place the first application and thereafter repeating acts of claim 1 on the second node.

3. The method of claim 2, further comprising determining that the first application cannot run on any of the nodes in the cluster and ceasing attempting to run the application on a node in the cluster.

4. The method of claim 1, wherein the one or more other application are selected to be shut down based on having a priority that is lower than the first application.

5. The method of claim 1, wherein determining that an application cannot be placed on the first node comprises receiving resource information about the node and applications running on the node.

6. The method of claim 1, wherein determining that the first application may be able to be placed on the first node by shutting down or moving one or more other applications running on the first node is based on received resource information.

7. The method of claim 1 further comprising, attempting to restart one or more of the one or more applications that were shut down.

8. The method of claim 7, wherein determining which application to restart is done in fashion to prevent overloading the cluster by doing an ordered restart.

9. The method of claim 1, wherein processes used to shut down or move the one or more other applications is determined based on relative priorities of the first application and the one or more other applications.

10. The method of claim 1 further comprising, preventing the one or more other applications that were shut down from restarting to prevent a cascade of preemptions and restarts.

11. The method of claim 1, wherein determining that the first application may be able to be placed on the first node by shutting down or moving one or more other applications running on the first node comprises:
   determining that the first application has a priority that is greater than the one or more other applications;
   determining that the first application has a priority that is greater than or equal to a minimum preemptor priority level; and
   determining that the one or more other application have a priority level that is less than or equal to a maximum preemptee priority level.

12. In a distributed computing environment comprising a cluster, the cluster comprising a plurality of nodes, a computer readable medium comprising computer executable instructions that when executed by one or more processors, cause the following to be performed:
   determining that a first application cannot be placed on a first node in the first node's current running state;
   determining one or more other applications running on the first node that may be shut down or moved to allow the first application to be placed on the first node; and
   attempting to shut down or move the one or more other applications on the first node to place the first application, wherein the one or more other application are selected to be shut down or moved based on a determination of a fewest applications affected so as to minimize the number of applications that are shut down or moved to free up resources for the first application.

13. The computer readable medium of claim 12, further comprising determining that even after attempting to shut down or move the one or more other applications, that the first application cannot be placed on the first node, and as a result selecting a second node on which to place the first application and thereafter repeating acts of claim 1 on the second node.

14. The computer readable medium of claim 12, wherein the one or more other application are selected to be shut down based on having a priority that is lower than the first application.

15. The computer readable medium of claim 12, wherein determining that an application cannot be placed on the first node comprises receiving resource information about the node and applications running on the node.

16. The computer readable medium of claim 12, wherein determining that the first application may be able to be placed on the first node by shutting down or moving one or more other applications running on the first node is based on received resource information.

17. The computer readable medium of claim 12, further comprising attempting to restart one or more of the one or more applications that were shut down.

18. The computer readable medium of claim 12, wherein processes used to shut down or move the one or more other applications is determined based on relative priorities of the first application and the one or more other applications.

19. The computer readable medium of claim 12 wherein determining that the first application may be able to be placed on the first node by shutting down or moving one or more other applications running on the first node comprises:
- determining that the first application has a priority that is greater than the one or more other applications;
- determining that the first application has a priority that is greater than or equal to a minimum preemptor priority level; and
- determining that the one or more other application have a priority level that is less than or equal to a maximum preemptee priority level.

20. A distributed computing system, the computing system comprising:
- a plurality of computers wherein the computer are organized into a computing cluster;
- an application hosting module, wherein the application hosting module is configured to:
  - determine that a first application cannot be placed on a first node in the first node's current running state;
  - determine that the first application can be a preemptor that can preempt other applications on the first node by determining that the application meets a predetermined minimum preemptor priority;
  - determine that one or more other applications on the first node can be preemptees that can be preempted by the first application to free up enough resources to start the first application; and
  - determine that the first application may be able to be placed on the first node by shutting down or moving one or more other applications running on the first node, wherein the one or more other application to be shut down or moved are determined based on a determination of a fewest applications affected to minimize the number of applications that are shut down or moved to free up resources for the first application; and
- a preemptor module, wherein the preemptor module is configured to attempt to shut down or move the one or more other applications on the first node to place the first application.

* * * * *